US011871180B1

(12) United States Patent
Byrne et al.

(10) Patent No.: US 11,871,180 B1
(45) Date of Patent: *Jan. 9, 2024

(54) SUPERCOUPLING WAVEGUIDES, AND METHODS FOR MAKING AND USING SAME

(71) Applicant: The Government of the United States of America, as represented by the Secretary of the Navy, Arlington, VA (US)

(72) Inventors: Matthew S. Byrne, Austin, TX (US); Hussein Esfahlani, Lausanne (CH); Andrea Alu, Austin, TX (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 941 days.

This patent is subject to a terminal disclaimer.

(21) Appl. No.: 16/702,264

(22) Filed: Dec. 3, 2019

Related U.S. Application Data (60) Provisional application No. 62/774,639, filed on Dec. 3, 2018.

(51) Int. Cl.
*H04R 1/28* (2006.01)
*H04R 1/34* (2006.01)
(Continued)

(52) U.S. Cl.
CPC ........... *H04R 1/2857* (2013.01); *G01H 15/00* (2013.01); *G10K 11/025* (2013.01); *G10K 11/18* (2013.01); *H04R 1/345* (2013.01)

(58) Field of Classification Search
CPC ...... G10K 11/025; G10K 11/02; G10K 11/18; G10K 11/22; G10K 11/24; G10K 11/26;
(Continued)

(56) References Cited

U.S. PATENT DOCUMENTS

| 3,946,831 A * | 3/1976 | Bouyoucos | H04B 11/00 181/402 |
| 4,077,023 A * | 2/1978 | Boyd | G10K 11/24 310/365 |

(Continued)

OTHER PUBLICATIONS

Matthew Scott Byrne, "Acoustic Supercoupling with Compressibility-Near-Zero Effective Material Properties," Report Presented to the Faculty of the Graduate School of The University of Texas at Austin in Partial Fulfillment of the Requirements for the Degree of Master of Science in Engineering, Approved by Supervising Committee, Electrical and Computer Engineering Department, The University of Texas at Austin, dated May 2, 2018 (61 pages).

(Continued)

*Primary Examiner* — Edgardo San Martin
(74) *Attorney, Agent, or Firm* — Dawn C. Russell; Howard Kaisert (57) ABSTRACT

Supercoupling waveguides are provided in which acoustic impedance at an acoustic input port matches the acoustic impedance at an acoustic output port, where the acoustic path extending from the acoustic input port to the acoustic output port has a variable length. The supercoupling waveguides may be used in methods of sensing and measuring, and may be incorporated into sensors.

16 Claims, 9 Drawing Sheets

(51) Int. Cl.
  *G01H 15/00* (2006.01)
  *G10K 11/02* (2006.01)
  *G10K 11/18* (2006.01)
(58) Field of Classification Search
  CPC .......... G10K 11/28; G01H 15/00; H04R 1/20; H04R 1/28; H04R 1/2803; H04R 1/2853; H04R 1/2857; H04R 1/30; H04R 1/32; H04R 1/34; H04R 1/345; H04R 1/42
  See application file for complete search history.

(56) References Cited

U.S. PATENT DOCUMENTS

| | | | |
|---|---|---|---|
| 4,628,528 A | 12/1986 | Bose et al. | |
| 5,022,014 A * | 6/1991 | Kulczyk | G10K 11/24 367/87 |
| 5,540,248 A | 7/1996 | Drzewiecki | |
| 10,254,478 B2 | 4/2019 | Mazur et al. | |
| 10,911,861 B2 | 2/2021 | Buckland et al. | |
| 11,044,549 B1 * | 6/2021 | Byrne | G10K 11/02 |
| 2003/0132056 A1 | 7/2003 | Meyer | |
| 2011/0211720 A1 | 9/2011 | Adams | |
| 2013/0343564 A1 | 12/2013 | Darlington | |
| 2016/0212523 A1 | 7/2016 | Spillmann | |
| 2017/0125911 A1 * | 5/2017 | Alu | H01Q 13/103 |
| 2020/0154198 A1 | 5/2020 | Schneider | |

OTHER PUBLICATIONS

H. Esfahlani, M. S. Byrne, M. McDermott, and A. Alù,."Acoustic Supercoupling in a Zero-Compressibility Waveguide," AAAS, Research (Official Journal of Cast), vol. 2019, Article ID 2457870, 10 pages, published Mar. 24, 2019.
Romain Fleury and Andrea Alu, "Extraordinary Sound Transmission through Density-Near-Zero Ultranarrow Channels," Physical Review Letters, PRL 111, 055501, American Physical Society, published Jul. 29, 2013 (5 pages).
Norbert Cselyuszka, Milan Secujski, and Vesna Crnojevic Bengin, "Compressibiiity-Near-Zero Acoustic Metamaterial," Physics Letters A 378, 1153-1156, Elsevier, available online Feb. 24, 2014.
Hussein Esfahlani and Herve Lissek, "Generation of Acoustic Helical Wavefronts Using Metasurfaces," Physical Review B, vol. 95, 024312, American Physical Society, published Jan. 30, 2017 (5 pages).
Hussein Esfahlani, Matthew S. Byrne, and Andrea Alù, "Acoustic Power Divider Based on Compressibility-Near-Zero Propagation," Physical Review Applied 14, 024057, American Physical Society, published Aug. 20, 2020 (11 pages).
U.S. Appl. No. 62/774,639, filed Dec. 3, 2018, entitled "Impedance-Matching Device Enabling Division of Acoustic Power Levels of Uniform Phase or pi-Inverted Phase," inventors Matthew S. Byrne et al., Navy Case No. 108,764.
U.S. Appl. No. 16/702,328, filed Dec. 3, 2018, entitled "Supercoupling Power Dividers, and Methods for Making and Using Same," inventors Matthew S. Byrne et al., Navy Case No. 108,601, now U.S. Pat. No. 11,044,549, issued Jun. 22, 2021 (previously cited by the examiner).
C. Rasmussend and A. Alu, "Compressibility-Near-Zero Directive Sound," 14th International Congress on Artificial Materials for Novel Wave Phenomena—Metamaterials 2020, New York, USA, Sep-28-Oct.3, 2020, IEEE, X-447-X-449 (3 pages).
Curtis Rasmussen and Andrea Alu, "Compressibility-Near-Zero Acoustic Radiation," Physical Review Applied 15, 024022 (2021), accepted Jan. 8, 2021,published Feb. 10, 2021, American Physical Society (8 pages).
Inigo Liberal and Nader Engheta, "Near-Zero Refractive Index Photonics," Nature Photonics, vol. 11, Mar. 2017, www.nature.com/naturephotonics, review article, published online Mar. 1, 2017,NPHOTON.2017.13, Macmillan Publishers Limited, part of Springer Nature, pp. 149-158, corrected after print Mar. 6, 2017 (12 pages).
Guancong Ma and Ping Sheng, "Acoustic Metamaterials: From Local Resonances to Broad Horizons," Science Advances, published by the American Association for the Advancement of Science (AAAS), vol. 2, Issue 2, Feb. 26, 2016, Acostics, Review, science. org (17 pages).
Matthew S. Byrne, Hussein Esfahlani, Matthew J. McDermott, an Andrea Alu, "Compressibility-Near-Zero Acoustic Supercoupling," meeting Abstract, 174th Meeting Acoustical Society of America, New Orleans, Louisiana, Dec. 4-8, 2017, The Journal of the Acoustical Society of America, vol. 142, No. 4, Pt. 2 of 2, Oct. 2017, p. 2577, www.acousticalsociety.org, https://acousticalsociety.org/174th_meeting/, published online (https://asa.scitation.org) Nov. 15, 2017 (9 pages total are attached hereto).

\* cited by examiner

--- 90° bend soft: 755.10 [Hz]
····· 180° bend soft: 756.52 [Hz]

SUPERCOUPLING WAVEGUIDES, AND METHODS FOR MAKING AND USING SAME

CROSS-REFERENCES TO RELATED APPLICATIONS

This application claims priority under 35 U.S.C. § 119(e) to U.S. Provisional Application No. 62/774,639, filed on Dec. 3, 2018. The entire contents of this application are incorporated herein by reference.

This application is also related to counterpart Non-Provisional Application No. 16/702,328, entitled "Supercoupling Power Dividers, and Methods for Making and Using Same," filed on Dec. 3, 2019, now U.S. Pat. No. 11,044,549, issued on Jun. 22, 2021 (Navy Case No. 108,601). The entire contents of this application are incorporated herein by reference.

FIELD OF THE INVENTION

Supercoupling waveguides are provided in which acoustic impedance at an acoustic input port matches the acoustic impedance at an acoustic output port, where the acoustic path extending from the acoustic input port to the acoustic output port has a variable length. The supercoupling waveguides may be used in methods of sensing and measuring, and may be incorporated into sensors.

BACKGROUND OF THE INVENTION

Over the past decade, significant attention has been paid to zero-index metamaterials (ZIMs), due their extreme capabilities for wave manipulation (N. Engheta, "Pursuing near-zero response," *Science*, vol. 340, no. 6130, pp. 286-287, 2013). These materials can be described by governing equations that are temporally and spatially decoupled, due to the unusual physics enabled by near-zero constitutive parameters.

Supercoupling in electromagnetics has been achieved in part because conducting waveguides naturally support effective zero-index properties at the cut-off of their dominant mode of propagation. This phenomenon has enabled electromagnetic supercoupling, without having to realize a metamaterial through periodic arrays of small inclusions, by operating a hollow waveguide at cut-off. Unfortunately, conventional acoustic waveguides typically do not provide a cut-off for their dominant propagating mode, as these modes are longitudinal in nature.

The analogue of zero-permittivity in acoustics, for the realization of acoustic supercoupling, is density-near-zero metamaterials. One approach theoretically showed that energy could be squeezed through ultranarrow acoustic channels by employing a waveguide filled with arrays of transverse membranes (R. Fleury and A. Alu, "Extraordinary sound transmission through density-near-zero ultranarrow channels," *Phys. Rev. Lett.* 111, 055501 (2013)), which indeed realized an effective zero-density ultranarrow channel.

However, challenges with viscothermal loss and the accurate tuning of multiple membrane resonances have prevented the practical realization of density-near-zero acoustic supercoupling devices. A waveguide loaded with Helmholtz resonators in the form of low-pass filters was shown to support compressibility-near-zero properties and uniform phase through an intermediate channel (N. Cselyuszka, et al., "Compressibility-near-zero acoustic metamaterial," *Phys. Lett. A* 378, 1153-1156 (2014)). In order to achieve supercoupling, extreme precision in these arrays of resonators would be required. It would be difficult and impractical to assemble acoustic waveguides with membranes and resonators that are incorporated with the required degree of precision to achieve acoustic supercoupling.

Accordingly, there is a need in the art to provide acoustic waveguides that achieve supercoupling without requiring the use of membranes or resonators.

SUMMARY OF THE INVENTION

The invention described herein, including the various aspects and/or embodiments thereof, meets the unmet needs of the art, as well as others, by providing supercoupling waveguides in which acoustic impedance at an acoustic input port matches the acoustic impedance at an acoustic output port, where the acoustic path extending from the acoustic input port to the acoustic output port has a variable length. The supercoupling waveguides may be used for sensing and measurement, and incorporated into sensors. The devices and methods of the invention may achieve compressibility-near-zero (CNZ) acoustic supercoupling without embedded membranes or resonators.

According to a first aspect of the invention, supercoupling waveguide apparatus are provided. The waveguide apparatus include an acoustic input port having an input cross-sectional area, where the acoustic input port is adapted for receiving an acoustic signal having an impedance; an acoustic output port having an output cross-sectional area, wherein the acoustic output port is adapted for transmitting the acoustic signal; and an acoustic path extending from the acoustic input port to the acoustic output port, the acoustic path having a variable length and a path cross-sectional area that is greater than the input cross-sectional area. The input and output cross-sectional areas are equal, and the impedance of the acoustic signal at the acoustic input port matches the impedance of the acoustic signal transmitted by the acoustic output port.

Another aspect of the invention provides methods for achieving supercoupling in an acoustic path. The methods include providing an acoustic path comprising a an air-filled channel and a boundary layer comprising a material having a Young's modulus (E) that is about 200 GPa or greater, where the acoustic path has an acoustic input port and at least one acoustic output port; and providing a signal having an impedance at the acoustic input port, where the signal is transmitted through the acoustic path to the at least one acoustic output port. The total signal at the at least one acoustic output port has an impedance equal to the impedance of the signal at the acoustic input port.

Another aspect of the invention provides methods for achieving acoustic supercoupling without the use of membranes or resonators.

A further aspect of the invention provides methods for achieving impedance matching using a uniform-phase acoustic power divider.

Other features and advantages of the present invention will become apparent to those skilled in the art upon examination of the following or upon learning by practice of the invention.

DETAILED DESCRIPTION OF THE INVENTION

The invention is directed to supercoupling waveguides in which acoustic impedance at an acoustic input port matches the acoustic impedance at an acoustic output port, where the acoustic path extending from the acoustic input port to the acoustic output port has a variable length. Methods for achieving compressibility-near-zero (CNZ) acoustic supercoupling in waveguides are also provided.

Methods for achieving acoustic supercoupling and matching acoustic impedance at an input waveguide port with the combined acoustic impedance of an output waveguide port are also provided.

Metamaterials are artificial materials made using subwavelength microstructures that exhibit properties not found in naturally-occurring materials. Sound waves travelling through materials are primarily controlled via bulk modulus ($\beta$), mass density ($\rho$), and chirality. Acoustic metamaterials control, direct and manipulate sound waves in gases, liquids, and solids. Acoustic zero-index meta-materials (ZIMs) and near-zero-index meta-materials (near-ZIMs) can be designed to function as a total reflector or a total transmitter, and have been demonstrated, for example, by using periodic structures to create a Dirac cone at the $\Gamma$ point of the Brillouin zone. In accordance with the present invention, acoustic metamaterials exhibit hard acoustic boundary conditions (i.e., a large impedance mismatch between the filling medium and surrounding medium) and preferably have a refractive index that is nearly zero, and more preferably have a refractive index of zero.

The devices and methods of the invention beneficially achieve acoustic supercoupling without requiring the use of embedded membranes or resonators. The invention avoids and/or eliminates the need to use membranes or resonators within the waveguides of the invention. Although membranes and resonators (e.g., low-pass filters) can be used to create an array of membranes that resonate at the same frequency, in practice it is difficult to incorporate them in a manner such that they will vibrate at exactly the same frequency. The attachment of membranes within the waveguide can cause irregularities that may prevent supercoupling.

Waveguides

Figure 1:
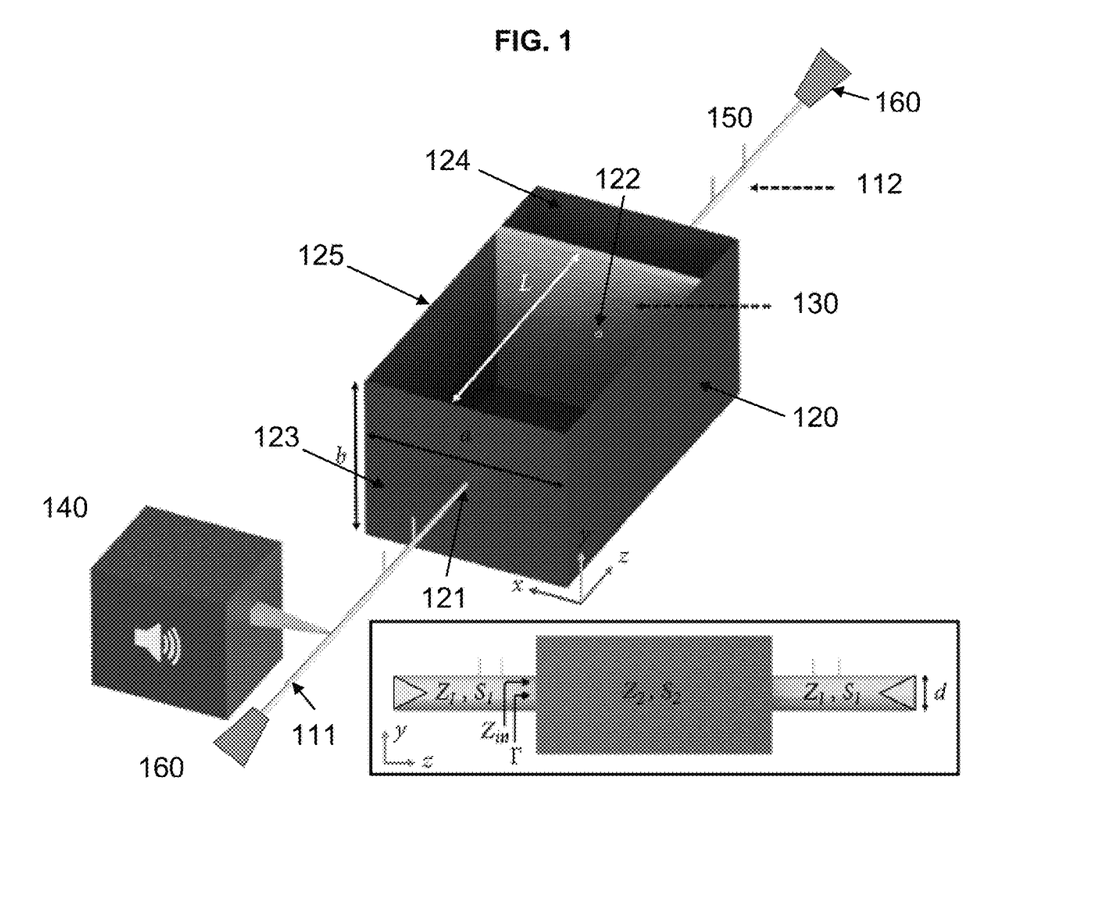
FIG. 1 depicts a CNZ supercoupling waveguide in which input and output ports are connected by a much wider intermediate channel having variable length.

As shown in FIG. 1, the supercoupling waveguide apparatus of the invention include an input waveguide 111 and an output waveguide 112 that are connected by an intermediate channel 120.

The input and output waveguides 111, 112 are not particularly limited in composition, and may be formed from metals (such as brass, copper, silver, aluminum, mild steel, stainless steel), ceramics (such as alumina), and composite or plastic materials. The waveguides are preferably cylindrical, and have cross-sections defined by a radius r (not shown) and a cross-sectional area $S_1$. For waveguides that are not cylindrical, the determination of cross-sectional area $S_1$ is based on the end shape. The waveguides may be solid or hollow, and in some aspects of the invention, the input waveguide 111 may have a length and cross-sectional area that is the same as the length and cross-sectional area of the output waveguide 112. Preferably the cross-sectional area of the input and output waveguides 111, 112 is the same.

The waveguides may each include microphone ports 150, and the input waveguide 111 may include an input for a source of acoustic signal 140 (such as an acoustic driver, speaker, horn, or any other source of acoustic input). In some aspects of the invention, the ends of one or both of the input and output waveguides 111, 112 are covered with an anechoic foam 160.

The input and output waveguides 111, 112 are in acoustic communication with the intermediate channel 120 via input and output ports 121, 122, respectively. The input and output ports 121, 122 preferably have the same cross-sectional shape and area as the ends of the input and output waveguides 111, 112. The intermediate channel 120 may have a variable length L, and may have ends 123, 124 that are rectangular, circular, or elliptical in cross-sectional area $S_2$. Both ends preferably have the same shape and dimensions. In some aspects of the invention, intermediate channels having a rectangular cross-section defined by width a and height b are preferred.

In some aspects of the invention, the ends 123, 124 and walls 125 of the intermediate channel 120 are formed using the same material. The channel walls 125 and ends 123, 124 may be formed, for example, using steel, ceramics (such as alumina, silica carbide, tungsten carbide), and other high-stiffness materials. Stiffness of the material may be expressed using Young's modulus (E, measured in GPa), and exemplary values for Young's modulus are provided for reference: $E_{Steel\ (ASTM-A36)}$=200 GPa; $E_{wrought\ iron}$=190-210 GPa; $E_{SiC}$=450 GPa; $E_{WC}$=450-650 GPa. In some aspects of the invention, it is preferred that the channel walls of the intermediate channel are formed of a material having a Young's modulus (E) that is about 200 GPa or greater. The hard boundary layer minimizes losses due to viscothermal boundary effects. The stiffness of the channel material is correlated to ability to trap the acoustic waves.

In other aspects of the invention, the walls 125 and ends 123, 124 of the channel are formed using different materials. Where the walls 125 and ends 123, 124 of the channel are formed from different materials, preferably the walls 125 of the channel are formed using a material that has an equal or greater stiffness or hardness than the material used to form the ends 123, 124. For example, the ends 123, 124 of the intermediate channel may be formed from wood or a composite material.

Regardless of configuration, the intermediate channels 120 of the invention are preferably filled with a material that has a low stiffness as compared to the channel walls 125. Preferably, the intermediate channel 120 is filled with air. A ZIM or near-ZIM may also be used to fill the intermediate channel 120. The intermediate channel 120 of the invention results in creation of first and second resonant modes, where the second resonant mode does not interfere with the first resonant mode. Supercoupling of acoustic signals occurs at the first resonant mode.

The invention incorporates a stiff boundary and a higher-order mode in an intermediate acoustic path having a cross-sectional area $S_2$ that is significantly greater (i.e., at least 16 times greater) than the cross-sectional area $S_1$ of the input port 121. In some aspects of the invention, $S_2$ is at least 25 times greater than $S_1$. Preferably, $S_2$ is at least 50 times greater than $S_1$. More preferably, $S_2$ is at least 100 times greater than $S_1$. This results in a waveguide that excites supercoupling with hard boundary conditions, and achieves supercoupling for various lengths of intermediate channel.

When the cross-sectional area at the input port 121 is equal or nearly equal to the cross-sectional area at the output port 122, the supercoupling waveguide apparatus of the invention provide an acoustic impedance Z1 at the acoustic output port that matches the acoustic impedance Z1 at the acoustic input port. This impedance matching may occur even when the acoustic path extending from the acoustic input port 121 to the acoustic output port 122 has a variable channel length L. The variation in channel length may be achieved, for example, by providing a movable panel 130 for adjustment of the channel length L of the intermediate channel. The movable panel 130 may have an input waveguide 111 or output waveguide 112 fixed thereto.

The waveguides of the invention achieve CNZ acoustic supercoupling, in which all or almost all power is transferred with a uniform phase from the input port to the output port. The waveguides of the invention may be hollow (e.g., filled with air), or may incorporate a ZIM or near-ZIM. The waveguides have a first resonant mode, and excite a higher-order mode at cut-off, which provides an experimentally viable, simple geometry demonstrating effective compressibility near zero and supercoupling for sound. The second, higher-order resonant mode does not interfere with the first resonant mode.

The use of boundary materials that exhibit significantly greater stiffness than the waveguide media permits excitation of a higher-order mode, which may synthesize effective soft boundary waveguide channels that support a cut-off at finite frequency and therefore enable acoustic tunneling phenomenon. The boundary minimizes signal losses due to viscothermal boundary effects. This approach establishes new pathways for extreme acoustic metamaterials, cloaking, acoustic sensing, and wave patterning.

The acoustic input signals from the source of signal 140 may be characterized based on a variety of features, such as impedance Z, power P, pressure p, and sound intensity J. Relationships among these variables may be calculated using constants that include the speed of sound waves in transmission medium c, and density of transmission medium ρ.

Devices and Methods

The supercoupling waveguides of the invention may be incorporated into small-scale (i.e., centimeter scale) acoustic supercoupling devices. These devices may include sensors, such as microelectromechanical (MEMS) sensors. The sensors may be used, for example, to create accelerometers, optical sensors, and Fabry-Perot interferometers (e.g., laser resonance type).

Methods of making the supercoupling waveguides are also provided.

In some aspects of the invention, methods are provided for achieving supercoupling in an acoustic path. The methods include providing an acoustic path having an air-filled channel and a boundary layer formed from a material having a Young's modulus (E) that is about 200 GPa or greater. The acoustic path has an acoustic input port and an acoustic output port. An acoustic signal is then provided through the input port (optionally via an input waveguide in acoustic communication with the input port), which is transmitted through the acoustic path to the acoustic output port.

In order to achieve supercoupling, the cross-sectional area of the acoustic input port is equal to the combined cross-sectional areas of the acoustic output port. When supercoupling is achieved in the acoustic path, the combined signals at the acoustic output port have an impedance equal to the impedance of the signal at the acoustic input port.

EXAMPLES

The invention will now be particularly described by way of example. However, it will be apparent to one skilled in the art that the specific details are not required in order to practice the invention. The following descriptions of specific embodiments of the present invention are presented for purposes of illustration and description. They are not intended to be exhaustive of or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated.

Example 1. Acoustic Waveguide Configuration

The experimental setup was built from an off-the-shelf steel welder's tool box with dimensions of a=0.450 m, b=0.382 m, L=0.79 m, and wall thickness=1.54 mm. The input and output waveguides were nearly-identical aluminum tubes with inside diameter=12.6 mm, length of 92 cm, and wall thickness of 1.6 mm. The input waveguide was fed by a horn that was mounted transversely to the direction of propagation, and both input and output waveguides were terminated with anechoic foam to suppress standing waves in the tubes. Measurements were carried out with a procedure similar to that used in H. Esfahlani, et al., "Generation of acoustic helical wavefronts using metasurfaces," *Physical Review B: Condensed Matter and Materials Physics*, vol. 95, Article ID 024312, 2017, and following the standards of B. H. Song and J. S. Bolton, "A transfer-matrix approach for estimating the characteristic impedance and wave numbers of limp and rigid porous materials," *The Journal of the Acoustical Society of America*, vol. 107, no. 3, p. 1131, 2000; and "Standard test method for measurement of normal incidence sound transmission of acoustical materials based on the transfer matrix method," Tech. Rep. ASTM E2611-09, ASTM International, West Conshohocken, Pa., USA, 2009. Due to the small dimensions of the input and output waveguides, a modest amount of acoustic boundary-layer loss was observed in the waveguides alone. This was corrected for by employing a complex value of $k_z$ in the transfer-matrix equations, where $k_z=\beta+j\alpha$ and $\alpha\approx-0.13$ m$^{-1}$, according to D. T. Blackstock, *Fundamentals of Physical Acoustics*, John Wiley & Sons, Hoboken, N.J., USA, 2001.

Example 2. Acoustic Tunneling with Varying Boundary Conditions

The configuration of Example 1 was used to study supercoupling and compressibility-near-zero properties in a simple waveguide geometry.

In this configuration, a wide intermediate channel, with specific acoustic impedance $Z_2$ and cross-sectional area $S_2$, is sandwiched between two narrow input/output channels, each with specific acoustic impedance $Z_1$ and cross-sectional area $S_1$. The input waveguide is fed at a frequency close to a cut-off frequency of the intermediate channel. Due to the emergence of cut-off in the acoustic waveguide, there will be propagation of a mode associated with that specific cut-off frequency, and more importantly, dispersion will occur near the cut-off frequency. Therefore, it is expected that the effective material properties of the intermediate waveguide ($\rho_{eff2}$, $\kappa_{eff2}$) become frequency-dependent and different from the material properties of the filling fluid at frequencies away from cut-off ($\rho_{0_2}$, $\kappa_{0_2}$). The proposed waveguide configuration of FIG. 1 with specific wall boundary arrangements can exhibit $\kappa_{eff2} \to \infty$ ($C_{eff2} \to 0$) when it is operated near its cut-off frequency. This condition can lead to impedance matching, uniform phase, and supercoupling.

Parallel Soft/Hard Boundary Conditions

In the waveguide configuration of Example 1, all the walls are hard except for two parallel walls at $x=\{0, \alpha\}$. Such a waveguide exhibits its first non-trivial cut-off at a frequency that coincides with near-zero compressibility. The acoustic wave will tunnel, with uniform phase and full transmission, when operated near its first non-trivial cut-off frequency.

Figure 2A:
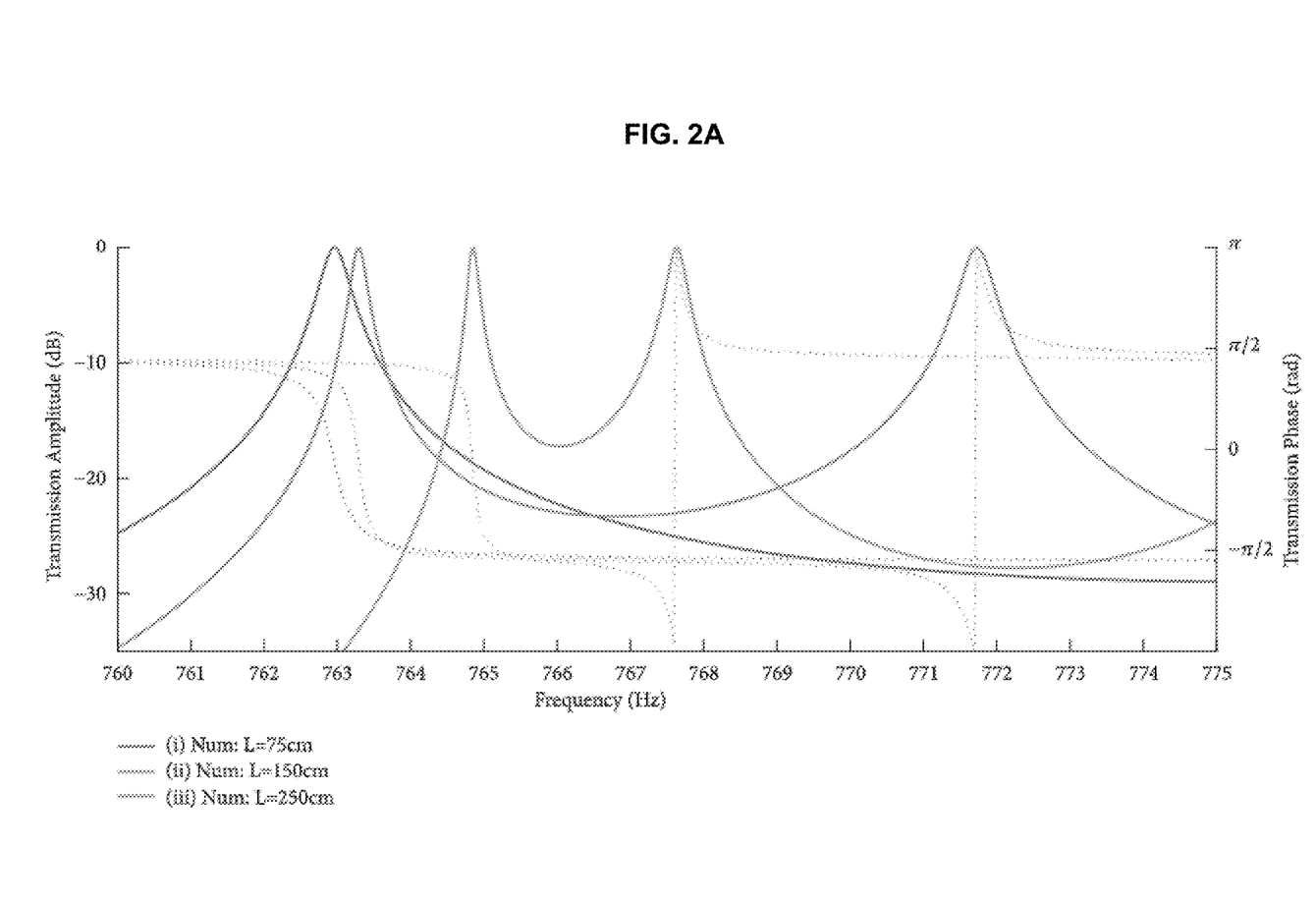
FIGS. 2A-2C are graphs of phase shifts in waveguides operated near the cut-off frequency.
Figure 2B:
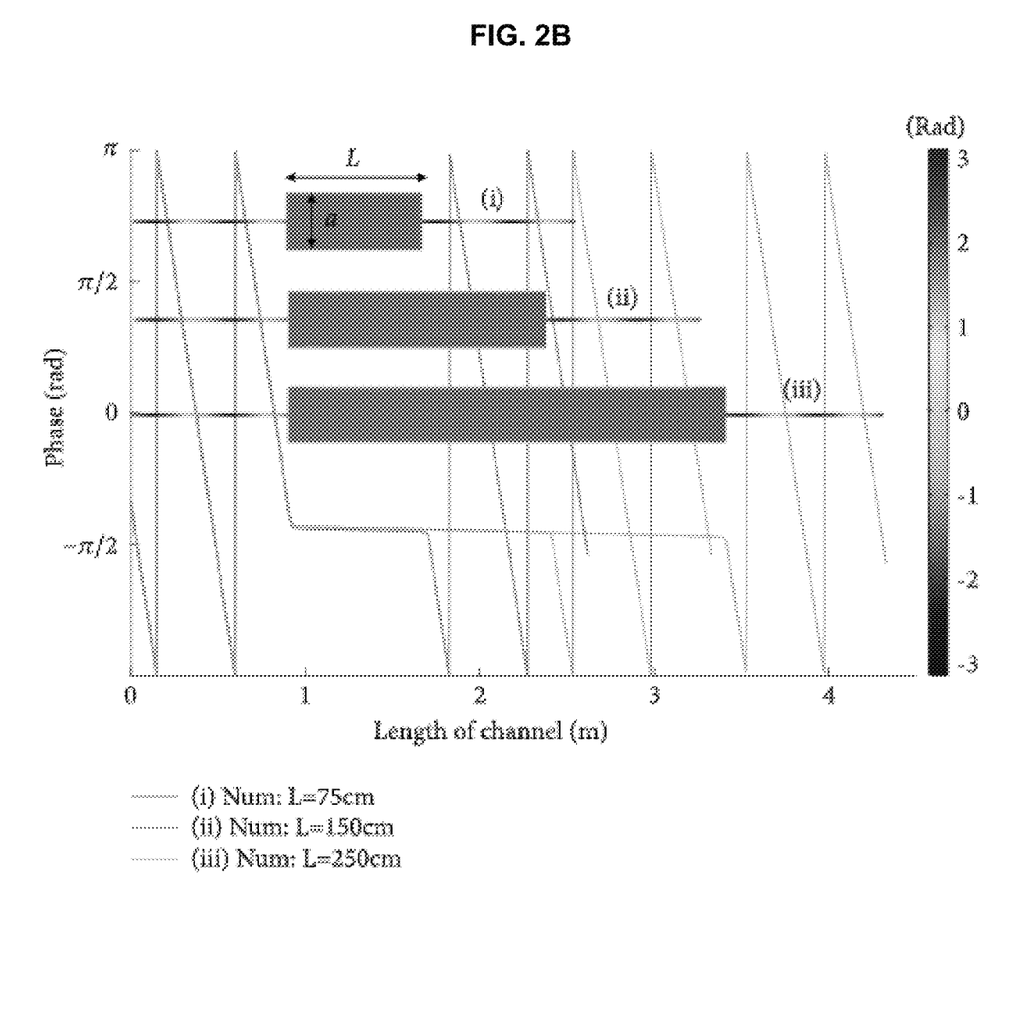
Figure 2C:
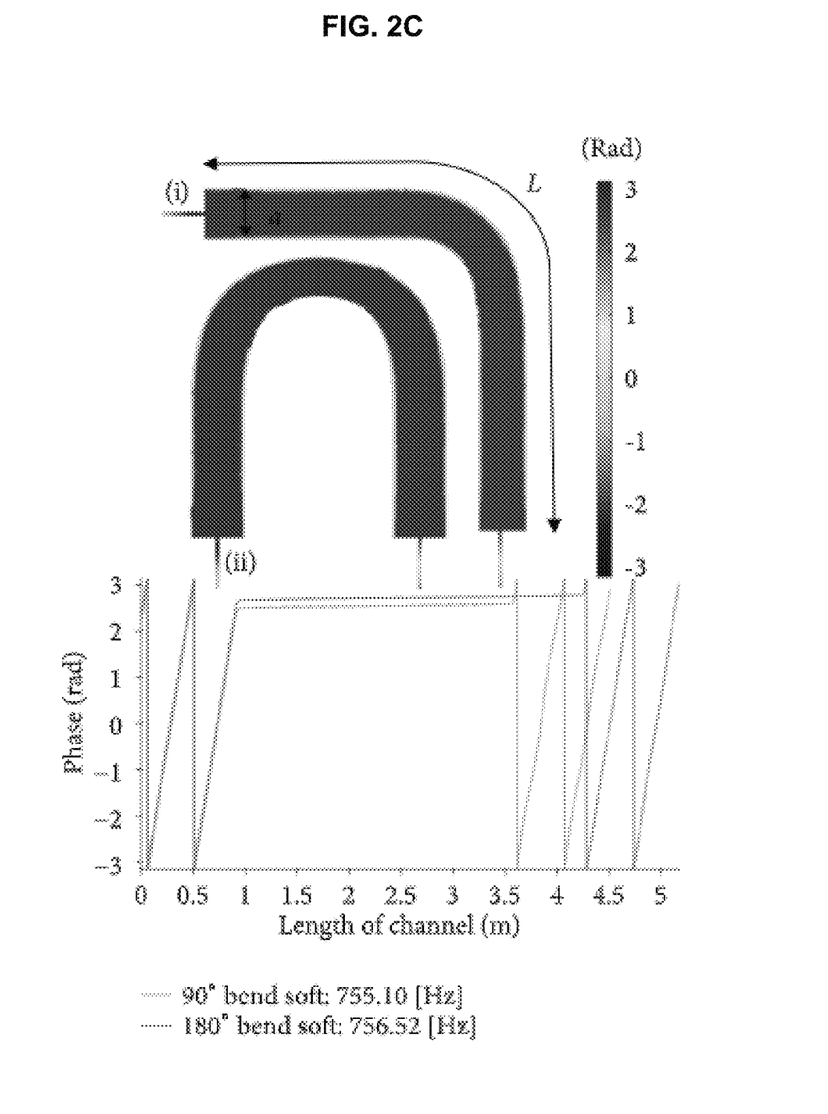

FIGS. 2A-2C show waveguides with two soft and two hard boundaries, operated near the cut-off frequency. FIG. 2A shows a calculated transmission phase and amplitude. The design parameters are similar to the experimental setup, with only the length being modified (a=0.225 m, b=0.382 m, and d=12.6 mm). FIG. 2B shows a phase distribution through the CNZ channel near the first cut-off frequency for different lengths. $f_{tunneling}$ (i)=763.0 Hz, $f_{tunneling}$ (ii)=763.3 Hz, and $f_{tunneling}$ (iii)=764.9 Hz.

Figure 3A:
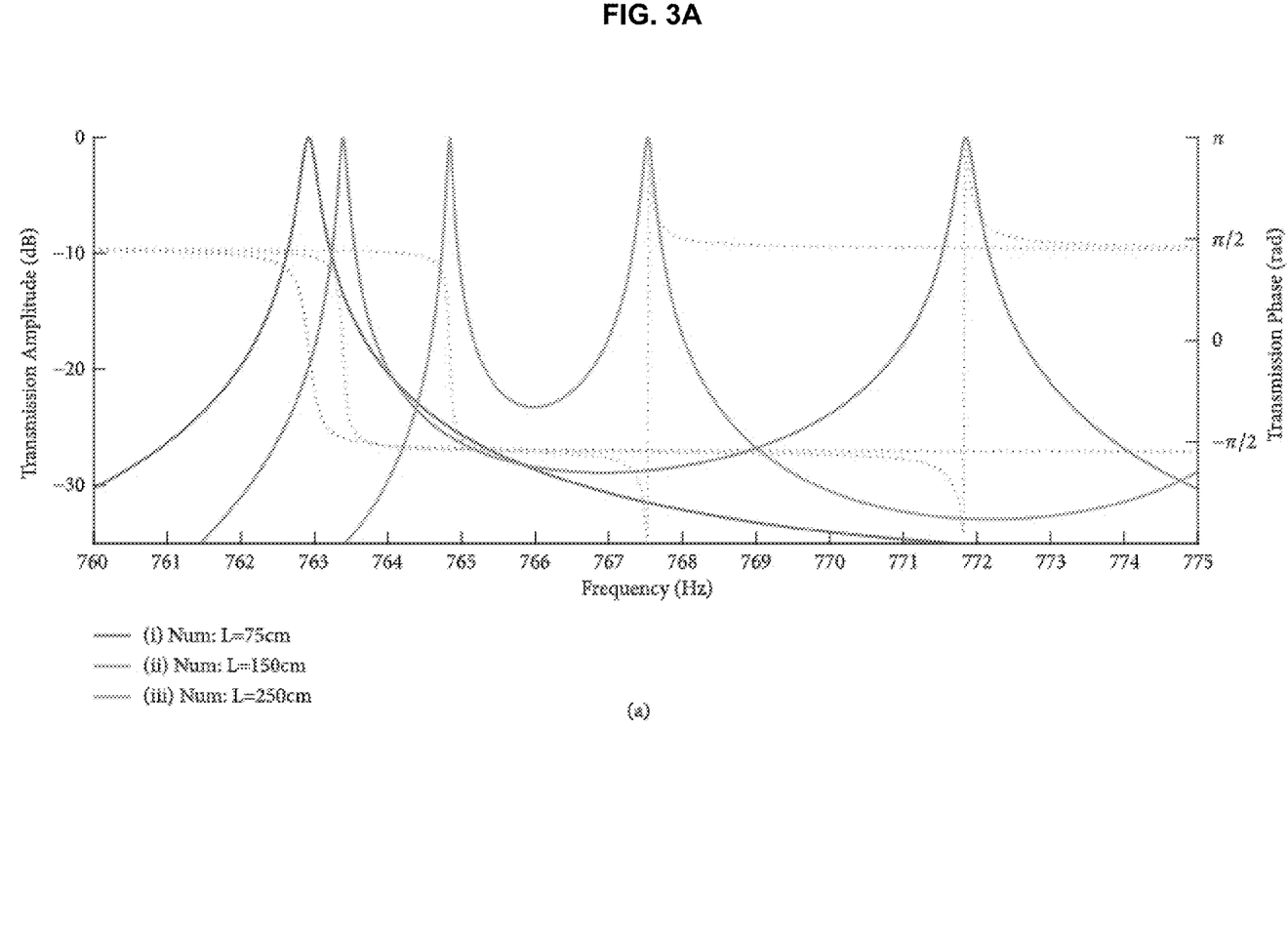
FIGS. 3A-3C are graphs of phase shifts in waveguides operated near the higher-order (2,0) mode cut-off of the intermediate channel.
Figure 3B:
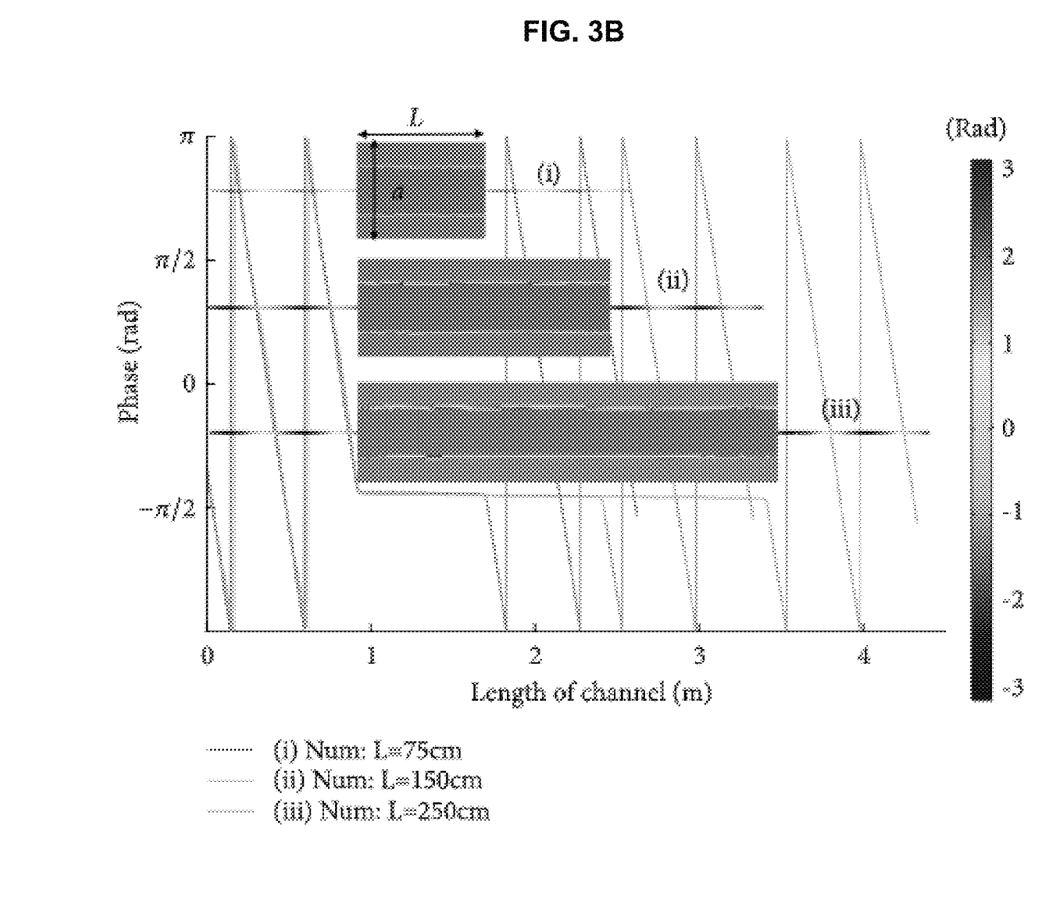
Figure 3C:
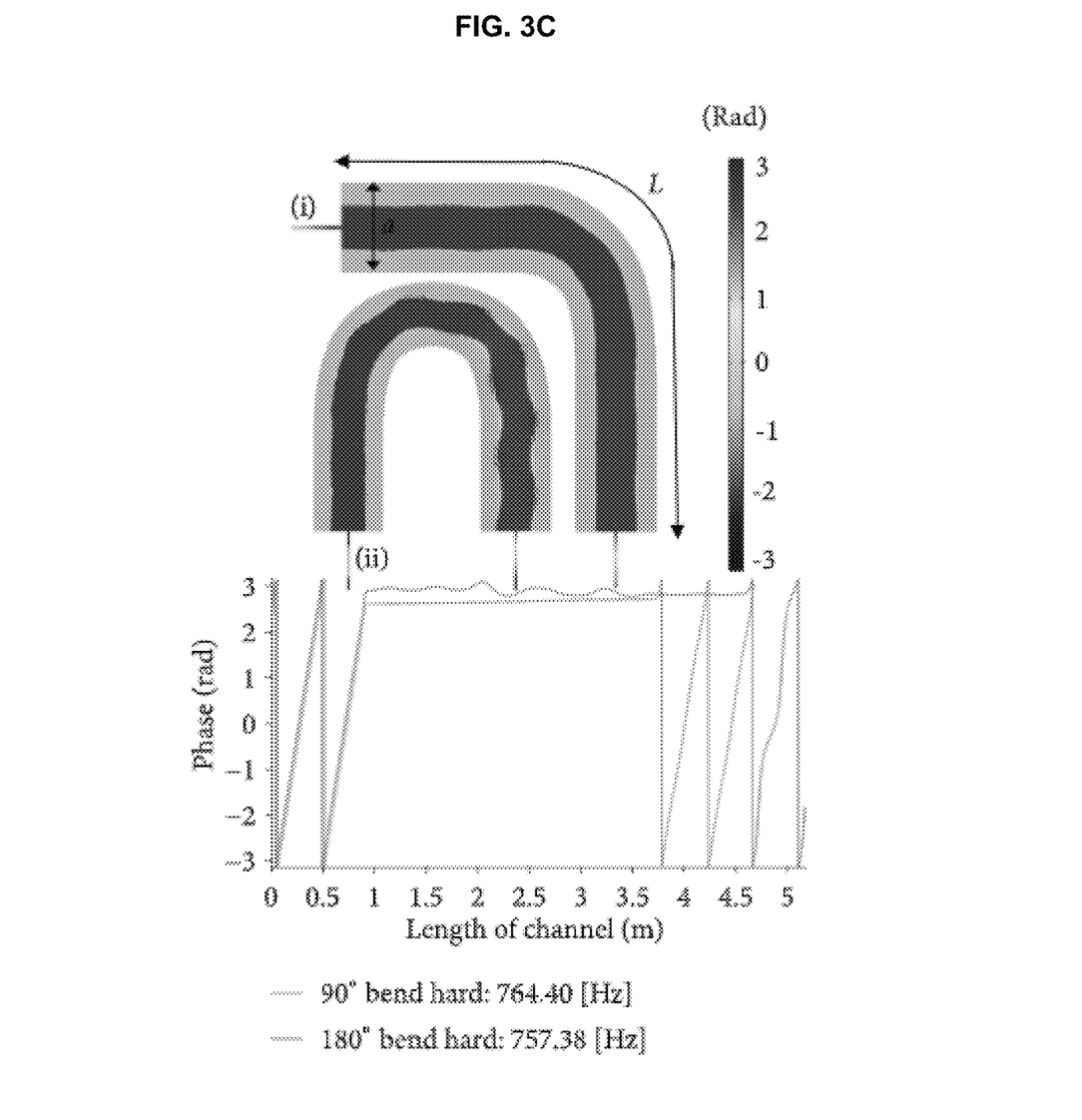

FIGS. 3A-3C show waveguides with hard boundary walls, operated near the higher-order (2,0) mode cut-off of the intermediate channel. The higher-order mode matches the phase pattern of a soft-hard (1,0) mode (from FIGS. 2A-2C) in the center of the channel. This presents an "effective soft boundary" along the planes where the phase flips by $\pi$. This flip results from a change in sign of the pressure, which is a purely real-valued standing wave. FIG. 3A provides the numerical results for transmission phase and amplitude. The design parameters are similar to the experimental setup, with only the length being modified (a=0.450 m, b=0.382 m, and d=12.6 mm). FIG. 3B shows the phase distribution through the CNZ channel near the (2,0) cut-off frequency for hard-hard configurations of different lengths, in which $f_{tunneling}$ (i)=762.9 Hz, $f_{tunneling}$ (ii)=763.4 Hz, and $f_{tunneling}$ (iii)=764.8 Hz.

The cross-sectional areas of the input/output waveguides are kept fixed, while the dimensions of the channel are changed. FIG. 2A shows the transmission coefficients of the proposed configuration, having two parallel soft and two parallel hard boundaries, with varying channel lengths (L). For each length, the first peak corresponds to the tunneling frequency, which occurs near the cut-off frequency of the intermediate channel. The following peaks in the transmission coefficient are due to Fabry-Perot resonances. By increasing the length of the channel, the number of Fabry-Perot resonances increase for a fixed frequency spectrum, however the tunneling frequency remains unchanged and independent of the channel's length.

FIG. 2B presents the corresponding 2D phase profile in the channels at the tunneling frequencies. The phase is completely uniform, independent of the length of the coupling channel. The phase is uniform for two reasons: 1) $S_1=S_2$, which ensures that impedance matching between the input/output waveguides and the intermediate channel occurs very close to the cut-off frequency, and 2) the waveguide is fed near the cut-off frequency of the first propagating mode, therefore no other modes can propagate and thus interfere with the phase pattern within the channel.

The importance of the $S_1/S_2$ ratio can be further explained by analysis of the transmission coefficients for channels with similar dimensions but varying heights. For example, the phase variation is $\approx \pi/2$ for an acoustic tunneling channel of length L=400 cm and height b=8 cm, but the phase change becomes flat and $\approx 0$ for the same channel with a larger height, b=40 cm. This is explained by analytically studying the channel's acoustic impedance and phase velocity. By evaluating $$Z_z = \frac{\omega \rho_0}{S\sqrt{\left(\frac{\omega}{c_0}\right)^2 - \left(\frac{\pi}{a}\right)^2}} \quad \text{(A-1)}$$

The denominator of this relation goes to zero near the cut-off frequency, which can be expressed as $$f^c_{mn} = \frac{c}{2\pi}\sqrt{\left(\frac{m\pi}{a}\right)^2 + \left(\frac{n\pi}{b}\right)^2} \quad \text{(A-2)}$$

with m=1 and n=0, and the overall impedance value in Eq. 1 blows up. However, due to the very steep slope with respect to frequency, impedance matching should be satisfied in a close vicinity of the cut-off frequency to achieve very high phase velocity, thus ensuring constant phase through the channel. This can be achieved by increasing the $S_1/S_2$ ratio, which moves the frequency of matched impedance towards the cut-off frequency and leads to very large value of phase velocity.

Parallel Hard/Hard Boundary Conditions

A supercoupling design with the intermediate channel consisting of all sound-hard boundary conditions is analyzed, with air as the filling fluid. Given that $S_1=S_2$, any coupling of the plane wave mode from the input waveguide to the intermediate channel would be heavily suppressed due to mismatch in the characteristic acoustic impedance. In this case, the transmission would be dominated by the matching condition of $$Z_1 = Z_2 \Rightarrow \frac{\sqrt{\rho_{eff1}\kappa_{eff1}}}{S_1} = \frac{\sqrt{\rho_{eff2}\kappa_{eff2}}}{S_2} \quad \text{(A-3)}$$

if $\kappa_{eff2} \to \infty$, assuming that $\rho_{eff1}\kappa_{eff1}$ represents a naturally-occurring fluid (and so the product would be positive and not very close to 0). Therefore, perfect impedance matching and phase uniformity in a hard-hard channel operated at a higher order mode are achieved, without interference in the phase pattern from the fundamental (0,0) mode.

FIG. 3A shows a length study for transmission amplitude and phase of the hard-hard waveguide. The same basic physics of the soft-hard configuration is verified, although the tunneling frequency is now $$f = \frac{c_0}{a},$$

corresponding to the (2,0) mode, rather than $$f = \frac{c_0}{2a}$$

of the (1,0) mode in the soft-hard configuration. The spatial phase pattern of FIG. 3B matches that of FIG. 2B in the center of the channel. In addition to this observation, the first non-trivial cutoff frequency now occurs at the (2,0) mode of the intermediate channel, thus resulting in an "effective soft boundary" along the planes where the phase flips by $\pi$. This presents all of the typical properties associated with a soft-walled acoustic waveguide, although counter-intuitively, it is observed to occur within a waveguide having all hard boundary conditions. This concept may be useful in designing waveguide structures which seek to avoid the fundamental (plane-wave) mode, but are confined to materials which are not substantially softer than the filling medium.

Next, the performance of the proposed configuration for the acoustic CNZ channel when it is bent is assessed. It is expected that, due to the quasi-static nature of the pressure field near the cut-off frequency, the acoustic wave tunneling occurs regardless of the shape of the channel.

FIG. 2C and FIG. 3C show the 2D phase profile of the pressure wave at the tunneling frequency for different bending cases, in which channels are bent 90° and 180°, for both the soft-hard and hard-hard configurations. It is clear that the phase is conserved through the channels and it is fully tunneled from the input to the output waveguide. This comparison also demonstrates the equivalency of operating a soft-hard waveguide in the (m,n)=(1,0) mode and operating a hard-hard waveguide in the (2,0) mode. FIG. 2C is a spatial variation of phase at the CNZ tunneling frequency for waveguides with 90° and 180° bends. Uniform phase was observed despite bending of the channel. Here, $f_{tunneling\_90}$ (i)=755.10 Hz, and $f_{tunneling\_180}$ (ii)=756.52 Hz. FIG. 3C shows the spatial variation of phase at the CNZ tunneling frequency under 90° and 180° bends. Here, a=0.450 m, b=0.382 m, $f_{tunneling\_90}$ (i)=764.40 Hz, and $f_{tunneling\_180}$ (ii)=757.38 Hz.

Figure 4A:
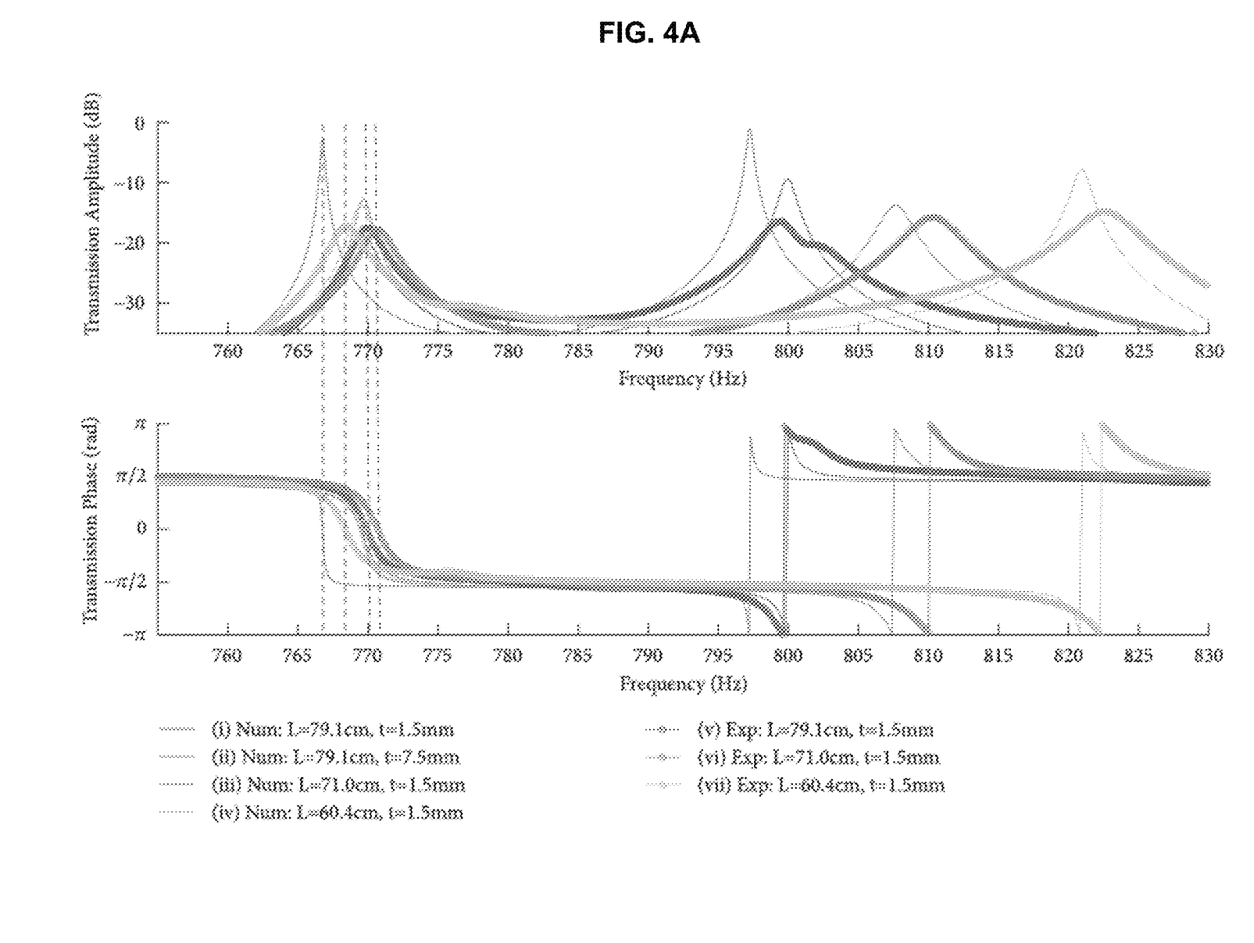
FIGS. 4A and 4B are graphs of phase changes in the supercoupling channel of a waveguide.
Figure 4B:
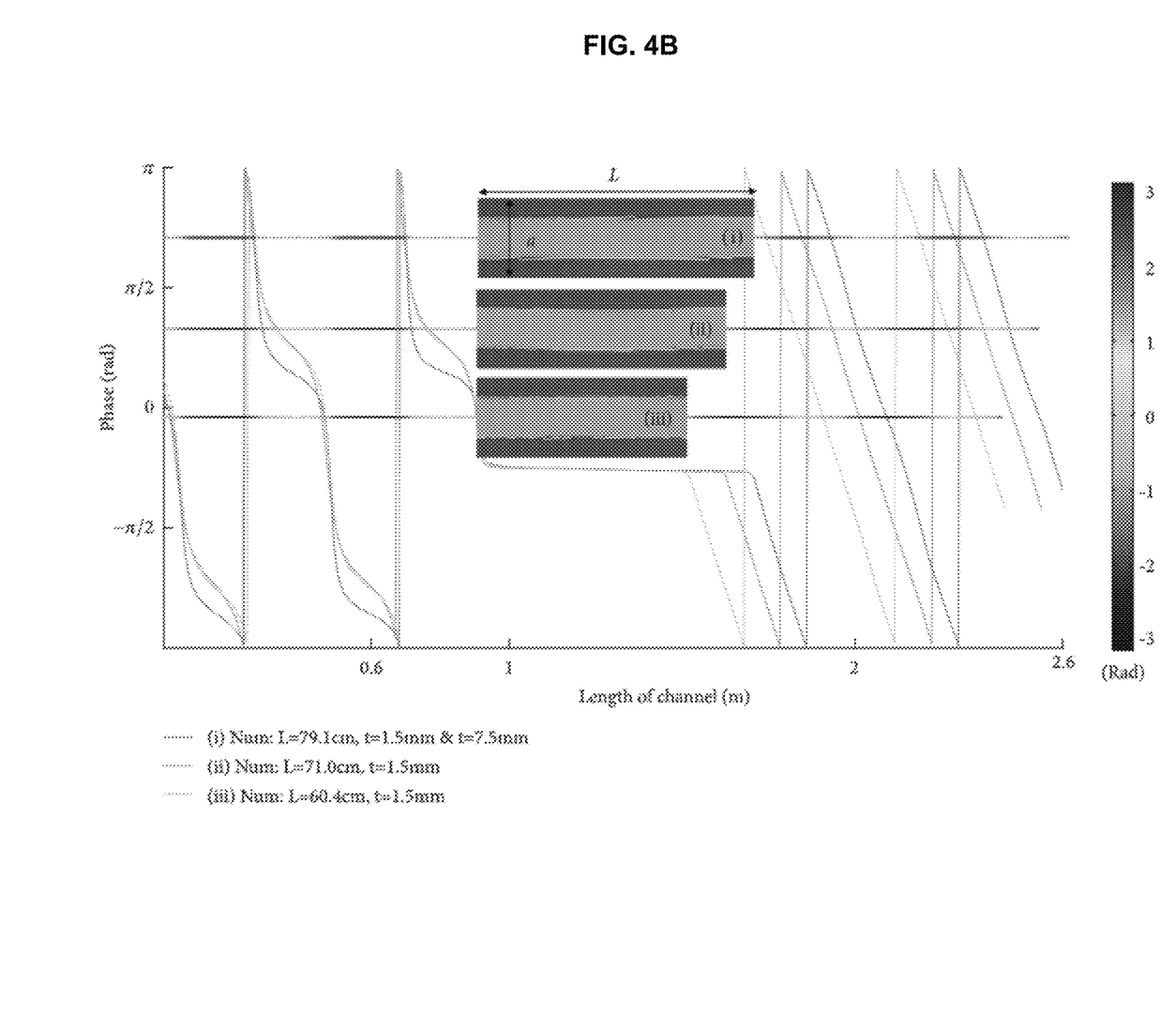

Finally, FIG. 4A shows a comparison of experimental results of CNZ supercoupling for an approximately hard-hard intermediate channel with numerical results for a similar geometry. Radiation and material loss from the intermediate channel were modeled using elastic shell boundary conditions with a loss tangent of 0.05. Note that curve (ii), in green, shows the transmission amplitude at the tunneling frequency (~765 Hz) is much higher than the others, due to the use of thicker walls for the intermediate channel. The experimental parameters were a=0.450 m, b=0.382 m, and d=12.6 mm. FIG. 4B shows a spatial phase distribution through the CNZ channel at the tunneling frequency for configurations with different lengths and $f_{tunneling}$ (i)=769.6 Hz, $f_{tunneling}$ (ii)=769.6 Hz, and $f_{tunneling}$ (iii)=769.4 Hz.

It can be seen from FIG. 4A that the measured data captures the basic physics of compressibility-near-zero supercoupling: impedance matching and near-zero phase delay in transmission, independent of the length of the intermediate channel. To aid in comparing numerical results to experiment, the model in FIG. 4A treated the boundaries of the coupling channel as elastic shells, which are capable of radiating sound into the surrounding air. This model also allowed for coupling of acoustic energy into vibrational modes of the walls, and for dissipation due to loss within the material (with tan $\delta$=0.01 for steel). This more realistic condition resulted in predicted transmission amplitudes with 8-13 dB of loss (depending upon the length), whereas the experimental results were more consistent with 17 to 18 dB of loss. This agreement in transmission is good however, considering the uncertainties in material properties and variation of the intermediate channel geometry from an ideal rectangular prism. The data displayed lower-Q resonances as compared to the numerical results, which is expected from the imperfect parallel walls of the welder's trunk used in the experiment, which included some curvature and tilt at each boundary.

Example 3. Transmission-Line Model for Acoustic Supercoupling

Assume two identical waveguides, each with cross-sectional area $S_1$, filled with a fluid with characteristic acoustic impedance $Z_1$. These waveguides are connected as an input and output to an intermediate rectangular acoustic channel, as in FIG. 1, with length L, fluid with characteristic impedance $Z_2$ and cross-sectional area $S_2$. Using transmission-line theory, the reflection coefficient for a plane wave from one port of this structure is written as $$\Gamma = \frac{Z_1 - Z_{in}}{Z_1 + Z_{in}} \tag{A-4}$$

where $Z_{in}$ is the impedance seen from the input waveguide when looking into the channel and it is calculated using $$Z_{in} = Z_2 \frac{Z_1 + jZ_2 \tan(k_2 L)}{Z_2 + jZ_1 \tan(K_2 L)}. \tag{A-5}$$

where kz is the wave number inside the intermediate channel. Plugging Eq. (A-5) in Eq. (A-4), the reflection coefficient reads:

$$\Gamma = \frac{(Z_2^2 - Z_1^2)\tan(k_z L)}{(Z_1^2 + Z_2^2)\tan(k_z L) + 2jZ_1 Z_2} \tag{A-6}$$

To satisfy conservation of energy, a lossless system must obey $|T|^2=1-|\Gamma|^2$. Thus, to achieve complete power transmission through the channel ($|T|^2=1$), the reflected power should become zero ($|\Gamma|^2=0$). The relation for reflection coefficient in Eq. (A-6) reveals that complete transmission is possible if tan($k_z L$)=0 or $Z_2=\pm Z_1$. The first condition corresponds to Fabry-Perot resonances and depends upon the length of the channel. However, the latter condition is achieved because of impedance matching. If the impedance matching condition, $Z_2=Z_1$, is expanded for the system of FIG. 1 and expressed in terms of the effective material properties of each waveguide, the result is Eq. (A-3), where $\rho_{eff}$ and $\kappa_{eff}$ are the effective mass density and bulk modulus respectively and denoted by subscripts of 1 for input/output waveguide and 2 for intermediate channel. When this condition is satisfied, full transmission through the system is expected.

In addition to impedance matching, supercoupling phenomena display uniformity of phase through the coupling channel. In terms of the effective mass density and bulk modulus of the coupling waveguide, the uniformity of the phase can be related to wave number and interpreted as $$k_z = \omega \sqrt{\frac{\rho_{\textit{eff}2}}{\kappa_{\textit{eff}2}}} \to 0 \tag{A-7}$$

Then, in order to achieve supercoupling, where the wave is fully transmitted with uniform phase in the intermediate channel, both Eq. (A-3) and Eq. (A-7) must be satisfied.

The cases in which supercoupling may be possible for the configuration of FIG. 1 are considered. For the sake of simplicity, it is assumed that the fluid in the input and output waveguides is fixed, and only the properties of the fluid in the intermediate channel can be altered ($\rho_{\textit{eff}2}$, $\kappa_{\textit{eff}2}$). In order to satisfy Eq. (A-7), one of the following criteria must be met:

$\rho_{\textit{eff}2} \to 0$: This case corresponds to the density-near-zero condition. From Eq. (A-3), supercoupling requires $S_1 \gg S_2$ (assuming that fluid #1 is a naturally occurring fluid, where $\rho_{\textit{eff}1}\kappa_{\textit{eff}1}$ is positive and not very close to 0).

$\kappa_{\textit{eff}2} \to \infty$: In this case, the stiffness of fluid #2 goes to infinity, which is equivalent to the compressibility tending toward zero ($\kappa_{\textit{eff}2}^{-1} \equiv C_{\textit{eff}2} \to 0$). Eq. (A-3) tells us that supercoupling now requires $S_1 \ll S_2$ (again assuming that fluid #1 has naturally occurring properties). This is the compressibility-near-zero (CNZ) condition.

$\rho_{\textit{eff}2} \to 0$ and $C_{\textit{eff}2} \to 0$: When both fluid parameters simultaneously approach zero, this is the density-and-compressibility-near-zero (DCNZ) case. Supercoupling may be achievable under these conditions, but it has not been investigated here.

Example 4. Cut-Off in Acoustic Waveguides and Compressibility-Near-Zero

For sound propagating in an acoustic waveguide with hard boundaries filled by a medium with density $\rho_{\textit{eff}}$ and bulk modulus $\kappa_{\textit{eff}}$, the following relations can be written:

$$\begin{cases} \frac{\sqrt{\rho_{\textit{eff}}\kappa_{\textit{eff}}}}{S} = Z_z \\ \sqrt{\frac{\rho_{\textit{eff}}}{\kappa_{\textit{eff}}}} = \frac{k_z}{\omega} \end{cases} \tag{A-8}$$

where $Z_z$ and $k_z$ are defined as the acoustic impedance and wave vector in the z-direction and S is the cross-sectional area of the waveguide. Solving the system of Eq. (A-8) for ($\rho_{\textit{eff}}$, $\kappa_{\textit{eff}}$) results in $$\begin{cases} \rho_{\textit{eff}} = \frac{Z_z S k_z}{\omega} \\ \kappa_{\textit{eff}} = \frac{Z_z S \omega}{k_z} \end{cases} \tag{A-9}$$

which allows retrieval of the effective constitutive parameters knowing impedance, wave number, operating frequency, and cross-sectional area of the waveguide. To view Eq. (A-9) near the cut-off frequency, $Z_z$ and $k_z$ should be determined for the acoustic waveguide.

Consider a waveguide with two parallel soft boundaries at $x=\{0, a\}$ and two parallel hard boundaries at $y=\{0, b\}$. For this configuration, the spatial pressure distribution is given by $$p_{mn} = A_{mn} \sin\left(\frac{m\pi}{a}x\right)\cos\left(\frac{n\pi}{b}y\right),$$

and it exhibits cut-off at discrete frequencies according to Eq. (A-2).

Due to the sinusoidal term in the pressure expression, p=0 for (m,n)=(0,0), thus preventing the propagation of the (0,0) mode as the first mode. This results in a nonzero first cut-off frequency (m,n)=(1,0), which is the first non-trivial cut-off frequency, only depending upon the width a of the channel.

Using $$p_{mn} = A_{mn}\sin\left(\frac{m\pi}{a}x\right)\cos\left(\frac{n\pi}{b}y\right)$$

and the relation of conservation of momentum $$\nabla p + j\omega\rho_0 u = 0 \tag{A-10}$$

the particle velocity u is $$u = -\frac{U_{mn}}{j\omega\rho_0}[k_x\cos(k_x x)\cos(k_y y)\hat{x} - \tag{A-11}$$

$$k_y \sin(k_x x)\sin(k_y y)\hat{y} - jk_z\sin(k_x x)\cos(k_y y)\hat{z}]e^{-jk_z z}$$

and $$Z_z = \frac{p}{Su_z}$$

for the (m=1, n=0) mode, which will be calculated as in Eq. (A-1).

Then, by combining Eq. (A-9) with Eq. (A-1), the effective material properties of the acoustic configuration with soft-hard boundaries near the (1,0) mode cut-off can be expressed in terms of the material properties of the filling fluid and dimensions of the channel by $$\begin{cases} \rho_{\textit{eff}2} = \rho_{0_2} \\ \kappa_{\textit{eff}2} = \dfrac{\kappa_{0_2}}{1 - \left(\dfrac{\pi c_0}{a\omega}\right)^2} \end{cases} \tag{A-12}$$

It is observed that the value of the effective bulk modulus blows up with $$f = \frac{c_0}{2a},$$

and consequently compressibility tends to zero.

This CNZ condition can be exploited to induce supercoupling through a soft-hard channel waveguide. These boundaries however can be difficult to realize in practical acoustic media. For a more realistic case, a waveguide configuration may be assumed in which all boundaries are composed of a hard material. This is a typical scenario for air-filled waveguides. In this case, the spatial pressure distribution is $$p_{mn} = A_{mn}\cos\left(\frac{m\pi}{a}x\right)\cos\left(\frac{n\pi}{b}y\right) \tag{A-13}$$

and the cut-off frequencies are also given by Eq. (2). Expression of pressure in Eq. (A-13) dictates that $p=A_{00}$ for $(m,n)=(0,0)$, thus the first cut-off frequency is zero and a plane wave mode can propagate for all frequencies. However, it can be seen that compressibility near zero (CNZ) occurs in a hard-hard waveguide that is operated near a higher cut-off frequency, with $(m,n)=(2,0)$, where $$\kappa_{\mathit{eff}2} = \frac{\kappa_{0_2}}{1-\left(\frac{c_0}{af}\right)^2}$$

and the CNZ frequency is $$f = \frac{c_0}{a}.$$

The hard-hard supercoupling configuration is designed in such a way that only the (2,0) mode is excited while all previous modes $\{(0,0), (1,0), (0,1), \ldots\}$ are not. This can be accomplished by ensuring that the input signal is driven close to the center of the intermediate channel as well as enforcing the constraint that $S_1=S_2$. These imposed geometrical restrictions prevent driving the odd modes, which must have a pressure null at the center of the input port. Furthermore, the even (0,0) mode (plane wave mode) is also suppressed due to the large impedance mismatch between the input channel and the intermediate channel.

An acoustic channel with either soft-hard or hard-hard boundaries will have CNZ properties. This will occur while it is fed near the geometric center of the channel and at a frequency near the appropriate cut-off frequency of a propagating mode, as long as the $S_1=S_2$ condition is met. In other words, supercoupling can be achieved in either of these waveguide configurations. Moreover, Eq. (A-2) with n=0 ensures that the cutoff frequency of such waveguides is independent of the waveguide's height (the dimension b) for corresponding supercoupling modes. A channel with an arbitrary cutoff frequency can be designed while ensuring the condition $S_1=S_2$, by adjusting the parameter b.

Example 5. Numerical Modeling of Acoustic Waveguide

Finite element analysis was conducted using Comsol Multiphysics. The Pressure Acoustics module was selected with the frequency domain solver. Air was chosen from the Comsol built-in material list as the filling fluid of all structures. Finally, the input and output ports were set to Plane Wave Radiation conditions, while the acoustic source was modeled as an Incident Pressure Field at the input port.

In FIG. 1, the walls of the intermediate channel were modeled as either hard or soft boundary conditions. For the simulation of experimental parameters and consideration of vibrational coupling in the results of FIG. 4A, the supercoupling system was first placed in an external rectangular domain filled with air. This domain enabled the modeling of leakage from the intermediate channel and was bounded by Perfectly Matched Layers (PMLs) to realize nonreflecting boundaries. Materials were chosen from the built-in material library as Steel AISI 4340 for the intermediate channel walls and aluminum for the input/output channel. The effects of viscothermal acoustic boundary-layer loss were modeled by specifying the input/output waveguides as coupled to Narrow Region Acoustics. Then, walls in the intermediate channel were numerically modeled as thin elastic shells in the Comsol Acoustic-Shell Interaction Module. Finally, the reflection and transmission coefficients were calculated using a four-microphone measurement technique similar to H. Esfahlani, et al., "Generation of acoustic helical wavefronts using metasurfaces," *Physical Review B: Condensed Matter and Materials Physics*, vol. 95, Article ID 024312, 2017, where the value of complex $k_z$ was derived from numerical simulations using complex sound speed.

Examples 1-5 provide theoretical and experimental validation of a geometrically simple form of near-zero-index supercoupling in acoustics. While the experimental results did not show total transmission of acoustic energy, there is a good understanding of the underlying losses, as indicated by computational results, which considered radiation and dissipative loss in the intermediate channel. Further discrepancies between measurements and predictions can be explained by irregular geometry and uncertainty of material properties of the off-the-shelf toolbox used for the intermediate channel in the experiment. Supercoupling transmission loss may be practically reduced below −1.9 dB if the intermediate channel is manufactured with a steel wall thickness of approximately 7.5 mm or higher (see FIG. 4A).

Compressibility-near-zero tunneling occurs when $S_2 \gg S_1$ (see FIG. 1), even in the case that all waveguides are filled with the same fluid. The supercoupling phenomenon can be understood as a dispersive impedance matching condition, which occurs when the coupling channel (with smaller characteristic impedance than the input waveguide) has an input impedance that appears nearly infinitely stiff. At this matching condition, the phase velocity approaches infinity, as long as $S_2/S_1$ is sufficiently large. From this, in principle, full amplitude transmission and total conservation of the phase can be achieved, independent of the height and length of the coupling channel. The acoustic waveguides of the invention, when driven near their cut-off frequency, exhibit compressibility-near-zero effective material properties. When this waveguide is constructed totally of hard boundaries and is operated at the (2,0) mode, it can be thought of as consisting of two effective soft boundaries. These effective soft boundaries consist of planar surfaces, along which the pressure field is equal to zero and the uniform phase of the tunneling mode flips by $\pi$.

It will, of course, be appreciated that the above description has been given by way of example only and that modifications in detail may be made within the scope of the present invention.

Throughout this application, various patents and publications have been cited. The disclosures of these patents and publications in their entireties are hereby incorporated by reference into this application, in order to more fully describe the state of the art to which this invention pertains.

The invention is capable of modification, alteration, and equivalents in form and function, as will occur to those ordinarily skilled in the pertinent arts having the benefit of this disclosure. While the present invention has been described with respect to what are presently considered the preferred embodiments, the invention is not so limited. To the contrary, the invention is intended to cover various modifications and equivalent arrangements included within the spirit and scope of the description provided above.

What is claimed:

1. A supercoupling waveguide apparatus, comprising:
    an acoustic input port having an input cross-sectional area, where the acoustic input port is adapted for receiving an acoustic signal having an impedance;

an acoustic output port having an output cross-sectional area, wherein the acoustic output port is adapted for transmitting the acoustic signal; and an acoustic path extending from the acoustic input port to the acoustic output port, the acoustic path having a variable length and a path cross-sectional area that is greater than the input cross-sectional area;

wherein the input and output cross-sectional areas are equal, and the impedance of the acoustic signal at the acoustic input port matches the impedance of the acoustic signal transmitted by the acoustic output port.

2. The supercoupling waveguide apparatus of claim 1, wherein the acoustic path exhibits compressibility-near-zero (CNZ) acoustic supercoupling.

3. The supercoupling waveguide apparatus of claim 1, wherein the acoustic input port receives the acoustic signal from an input waveguide.

4. The supercoupling waveguide apparatus of claim 3, where the acoustic signal is provided by an acoustic signal source in communication with the input waveguide.

5. The supercoupling waveguide apparatus of claim 4, where the acoustic signal source is selected from the group consisting of drivers, speakers, and horns.

6. The supercoupling waveguide apparatus of claim 1, wherein the acoustic output port transmits the acoustic signal through an output waveguide.

7. The supercoupling waveguide apparatus of claim 1, where the acoustic path comprises an air-filled channel and a boundary layer comprising a material having a Young's modulus (E) that is about 200 GPa or greater.

8. The supercoupling waveguide apparatus of claim 7, wherein the boundary layer minimizes losses due to visco-thermal boundary effects.

9. The supercoupling waveguide apparatus of claim 1, wherein the acoustic path has a path cross-sectional area that is at least 16 times greater than the input cross-sectional area.

10. The supercoupling waveguide apparatus of claim 1, wherein the acoustic path comprises a first resonant mode and a second resonant mode, wherein the second resonant mode does not interfere with the first resonant mode.

11. A method for achieving supercoupling in an acoustic path, comprising:

providing an acoustic path comprising an air-filled channel and a boundary layer comprising a material having a Young's modulus (E) that is about 200 GPa or greater, where the acoustic path has an acoustic input port and at least one acoustic output port;

providing a signal having an impedance at the acoustic input port, where the signal is transmitted through the acoustic path to the at least one acoustic output port;

wherein the total signal at the at least one acoustic output port has an impedance equal to the impedance of the signal at the acoustic input port.

12. The method of claim 11, wherein the acoustic path exhibits compressibility-near-zero (CNZ) acoustic supercoupling.

13. The method of claim 11, wherein the acoustic input port receives the signal from an input waveguide.

14. The method of claim 13, where the signal is provided by an acoustic signal source in communication with the input waveguide.

15. The method of claim 11, where the acoustic path comprises an air-filled channel and a boundary layer comprising a material having a Young's modulus (E) that is about 200 GPa or greater.

16. The method of claim 11, wherein the acoustic path comprises a first resonant mode and a second resonant mode, wherein the second resonant mode does not interfere with the first resonant mode.

* * * * *